United States Patent [19] [11] 4,226,952
Halasa et al. [45] Oct. 7, 1980

[54] THERMOPLASTIC ELASTOMER BLENDS OF ALPHA-OLEFIN POLYMERS AND HYDROGENATED MEDIUM AND HIGH VINYL BUTADIENE POLYMERS

[75] Inventors: Adel F. Halasa, Bath; David W. Carlson; James E. Hall, both of Akron, all of Ohio

[73] Assignee: The Firestone Tire & Rubber Company, Akron, Ohio

[21] Appl. No.: 68,281

[22] Filed: Aug. 20, 1979

[51] Int. Cl.$^3$ .............................................. C08F 8/04
[52] U.S. Cl. .................................................. 525/192
[58] Field of Search ....................... 525/192, 232, 240

[56] References Cited
U.S. PATENT DOCUMENTS 2,877,206  3/1959  Scott .................................... 525/192

Primary Examiner—J. Ziegler

[57] ABSTRACT

Thermoplastic elastomer blends of alpha-olefin polymers and copolymers, such as polypropylene, polyethylene, etc., having a melting point of at least 90° C. with hydrogenated butadiene medium and high vinyl polymers have good physical properties such as low brittle point, good impact resistance at low temperatures, minimum creep at high temperatures, and good elongation. The blends can be repeatedly processed and still maintain good physical properties. The amount of alpha-olefin polymer or copolymer in the blend may range from about 10 percent to about 60 percent with the amount of the hydrogenated polybutadiene correspondingly ranging from about 90 percent to about 40 percent based on the combined weight of the two components. The blends are mixed at temperatures at least as high as the melting point of the alpha-olefin polymer or copolymer. These blends have excellent ozone resistance and aging properties, as well as excellent paint adhesion.

16 Claims, No Drawings

THERMOPLASTIC ELASTOMER BLENDS OF ALPHA-OLEFIN POLYMERS AND HYDROGENATED MEDIUM AND HIGH VINYL BUTADIENE POLYMERS

BACKGROUND OF THE INVENTION

1. Field of the Invention

The present invention relates to the thermoplastic elastomer blends of alpha-olefin polymers such as polypropylene or of their copolymers, such as copolymers of ethylene and propylene, with hydrogenated medium or high vinyl butadiene polymers, which blends require no curing or vulcanization to develop elastomeric properties. Moreover, the invention also relates to such blends partially cured.

2. Related Prior Art

The term "thermoplastic elastomer" has generally been applied to elastomers which can be readily molded and remolded, or otherwise processed and reprocessed, by common or conventional thermoplastic methods. The thermoplastic elastomers do not require vulcanization to develop their desired physical properties. Only a few types of such thermoplastic elastomers are known, such as the thermoplastic polyurethanes, the thermoplastic polyesters, for example those sold under the "Hytrel" brand name, and the styrene block copolymers sold under the brand names of "Kraton" and "Solprene". Another thermoplastic elastomer is the blend of polypropylene and EPDM (ethylene-propylene-nonconjugated diene monomer) described in U.S. Pat. Nos. 3,758,743, 3,806,558 and 3,862,106.

It is known that the blending of a polybutadiene rubber with an alpha-olefin polymer such as polypropylene results in a material with poor properties. It is most surprising therefore to find, as in the present invention, that the hydrogenation of butadiene polymers of medium and high vinyl content effect such changes that the blending of such products with polymers and copolymers of alpha-olefins produce compatible products having good physical properties.

SUMMARY OF THE INVENTION

In accordance with the present invention it has been found that thermoplastic elastomers of excellent resistance to ozone and to aging, good paint adhesion, low brittle point, low temperature impact resistance, minimum creep at high temperatures and good elongation, are produced by the blending of crystalline polymeric alpha-olefins. The alpha-olefin polymers used in the practice of this invention comprise homopolymers of alpha-olefins monomers having 2 to 20 carbon atoms and also copolymers of two or more of said alpha-olefins, which alpha-olefin polymers have a melting point of at least 90° C. The content of alpha-olefin polymer in the blend is advantageously about 10 to 60 percent by weight, preferably about 15–48 percent, based on the total weight of the two components with the hydrogenated butadiene polymer comprising about 40–90 percent, preferably 52–85 percent by weight. The thermoplastic elastomer blend may be partially cured, if desired, to a melt flow index of at least 1.0.

The blend of this invention may be prepared by mixing the polymer components, preferably in powder form, by any convenient means, such as a rolling mill having heated rolls, etc., while heating the mixture at a temperature of at least the melting point of the polymeric alpha-olefin. If desired the preparation process may also include the step of partially curing the resultant blend to a melt flow index of at least 1.0 since the thermoplastic elastomers of this invention comprise uncured or partially cured blends of alpha-olefin polymers with hydrogenated butadiene medium or high vinyl polymers.

The medium and high vinyl butadiene polymers used for preparing hydrogenated polymers suitable for the blends of this invention may be prepared by any convenient method such as those described in the prior art, for example, U.S. Pat. No. 3,451,988. Such polymers advantageously contain at least 40 percent, preferably at least 50 percent by weight, of 1,2 or vinyl configuration. Moreover the butadiene polymers, as well as the hydrogenated product, advantageously have a molecular weight (number average) of 50,000 to 1,000,000.

Furthermore any convenient method may be used in the hydrogenation of the butadiene polymer which will effect at least 85 percent hydrogenation, preferably at least 95 percent hydrogenation of the unsaturation in the polymer. A particularly suitable catalyst system for the purpose comprises a combination of nickel, cyclohexene and triisobutyl aluminum as described more fully below.

Typical alpha-olefin monomers that may be used in preparing the alpha-olefin polymers include ethylene, propylene, 1-butene, 1-pentene, 1-hexene, 1-octene, 4-methyl-1-hexene, 4-ethyl-1-hexene, 6-methyl-1-heptene and the like. Ethylene is a preferred monomer and propylene is a highly preferred monomer. In addition to the homopolymers, the alpha-olefin polymer may be a copolymer made from two or more alpha-olefin monomers. An important element of this invention is that the alpha-olefin polymers or copolymers which are used have a melting point of 90° C. or higher. Advantageously these polymers and copolymers have a crystallinity of at least 45%, preferably at least 50% crystallinity. Preferred copolymers are those consisting of ethylene and propylene, and preferably those containing at least 50 percent by weight propylene. The copolymers may be either random or block copolymers and may be prepared by any convenient method that will give the crystallinity and melting point required, such as isotacticity and a melting point above 90° C. The number average molecular weight of the alpha-olefin polymer is advantageously in the range of 50,000 to 1,000,000.

The melt flow index of the isotactic alpha-olefin polymer, and especially isotactic polypropylene, can range from about 0.4 to about 30 with a preferred range being from about 2 to about 12 according to ASTM No. D-1238. Thus, an isotactic alpha-olefin polymer is preferred although from 0.1 up to about 15 percent by weight of a low crystalline atactic configuration, based upon the total weight of the alpha-olefin polymer, may be utilized. For example, isotactic polypropylene may be used which contains small amounts of atactic polypropylene. Small amounts of the atactic configuration of a particular alpha-olefin polymer are not only economical but also improve flow and do not significantly reduce the desired physical properties. However, amounts in excess of 15 percent of an atactic configuration of an alpha-olefin polymer are undesirable since the physical properties are generally adversely affected, although in some applications, such a blend may be acceptable and even desirable.

Regardless of the specific type of alpha-olefin polymer used, the particle size is generally that produced by normal and conventional polymerization techniques. For example, the particle size is advantageously greater than 1.0 micron and desirably larger than 5.0 microns, although the particle size may not be critical. From a practical standpoint, large particles such as up to 2 mm may be conveniently utilized, as well as even larger particles. Of course, since the alpha-olefin polymer is generally melt-blended with the hydrogenated butadiene polymer on a mill, even large particles such as diced polypropylene may be used.

It has been found that the addition of about 2 to 20 parts of polyisobutylene per 100 parts of the blend improves the texture, smoothness and surface gloss of injection molded plaques and gives improved tensile elongation when added to a blend of a polymeric alpha-olefin, such as polypropylene, and the hydrogenated butadiene polymer.

The blend of the alpha-olefin polymer and the hydrogenated butadiene polymer, whether partially cured or not, produces a thermoplastic elastomer, or in other words, the blend can be repeatedly reprocessed and, if partially cured, does not require further vulcanization to develop elastomeric properties. Thus the blend can be readily and repeatedly molded, extruded, or otherwise processed since it flows at temperatures at or above the melting point of the alpha-olefin polymer. Generally, a partial cure is preferred in that the properties exhibit improved tensile set as well as a remarkable increase in aging properties.

By "partial cure," it is meant that the butadiene polymer portion of the blend is crosslinked to an extent less than full cure or vulcanization. According to the present invention, a partial cure is achieved when the melt flow index (ASTM No. D-1238, condition "L", but with the exception that the load is 100 pounds) is at least 1.0 and preferably 10.0 or greater. Blends of the alpha-olefin polymer and the hydrogenated butadiene polymer which are cured in excess of a partial cure and have a melt flow index below 1.0 produce vulcanized blends or thermoset elastomers which are outside the scope of this invention. A partial cure may be obtained utilizing any conventional curing agent compound or method to give the defined melt flow index. Generally, good blends of the present invention will have a melt flow index of from about 90 to about 150 with a preferred melt flow index being approximately 120.

It is important in the practice of this invention that the alpha-olefin polymer and the hydrogenated butadiene polymer are mixed at a temperature equal to or greater than the melting point of the alpha-olefin polymer. Due to variations in molecular weight and tacticity, the melting point will vary over a small range for a particular alpha-olefin polymer. A typical polyethylene will have a melting point range of from about 127° C. to about 140° C. with a typical melting point of approximately 135° C. The melting point range for a highly preferred polypropylene is from about 150° C. to about 175° C. with a practical or typical melting point temperature of about 160° C. Thus, temperatures within this range, or desirably above it, are important in the practice of the present invention. The actual blending or mixing may be effected by any common or conventional mixing means and thus may be performed on a mill, a Banbury, a Brabender, a twin screw extruder, or the like. When a partial cure is desired, the two components may be blended and then partially cured. Alternatively, the hydrogenated butadiene polymer may be first partially cured and then blended with the alpha-olefin polymer.

Where the blend is to be partially cured, the butadiene polymer is one which has been hydrogenated to only about 85-95 percent saturation so that some unsaturation will be available for curing purposes.

When a partial cure is to be effected, the curing agent can be conveniently added, together with any desired conventional processing aids, compounding ingredients, etc., either before or during the blending step. Moreover, the partial cure may be achieved under either static conditions or dynamic conditions. Under static conditions, the partial cure may be achieved by placing a mixed blend containing the curing agent in an oven and heating to the desired temperature whereby partial cure occurs, such as at a temperature of from about 65° C. to 260° C., for approximately 5 to 30 minutes. A dynamic partial cure is achieved by working or processing the blend containing the curing agent on an open mill, in a Banbury, in an extruder or the like, at a temperature sufficient to bring about a partial cure such as from about 65° C. to 210° C. for approximately 5 to 20 minutes. Even if the dynamic cure occurs below the melting point of the alpha-olefin polymer, the dynamic blend temperature must be at a temperature above the melting point of the alpha-olefin polymer.

The curing agent used for a partial cure may be any known or conventional rubber curative or method known to those skilled in the art. Variations from standard procedures or compounds may, of course be utilized. Typical curing agents include the sulfur donors, the various peroxides, either aromatic or aliphatic, and low dosages of radiation. If a sulfur curing agent is utilized, generally from 0.01 to about 1.0 parts by weight per 100 parts of the blend is utilized with the preferred range being from about 0.1 to about 0.2 parts. Some representative examples of sulfur curing agents include sulfur, tetramethyl thiourea, 2-(hexamethyleniminothio)-benzothiazole, sulfur dichloride, sulfur monochloride, alkyl phenol, disulfide, and tetramethyl thiuram disulfide. A preferred curative is sulfur itself. Generally, it is desirable to use from about 1 to about 5 parts per 100 parts of blend of zinc oxide, conventional amounts of stearic acid and an accelerator, since very good antioxidant properties are imparted to the blend. In addition, this particular partial cure system, in combination with carbon black, gives surprisingly superior paint adhesion. These unexpected results are especially noted with regard to the highly preferred polypropylene.

The amount of the organic peroxides required to effect a partial cure generally varies from about 0.01 to about 0.5 parts by weight per 100 parts of the blend with a preferred range being from about 0.1 to about 0.3. Once again, any conventional peroxide compound may be utilized such as the aromatic diacyl peroxides, the aliphatic diacyl peroxides, dibasic acid peroxides, ketone peroxides, alkyl peroxyesters, alkyl hydroperoxides, and the like. Specific examples include dicumyl peroxide, dibenzoyl peroxide, diacetyl peroxide, bis-2,4-dichlorobenzoyl peroxide, and the like. The number of the various peroxides is enormous and any of them may be utilized, with the above specific compounds merely being representative examples. Preferred peroxide curatives are dicumyl peroxide and 2,5-bis(tertiary-butylperoxy)2,5-dimethylhexane.

Combinations of peroxides or combinations of sulfur curing agents as well as combinations of sulfur and peroxide curing agents may be utilized. Furthermore, curing agent ranges set forth above represent the amount of the active compound. Thus, if a curative is utilized such as dicumyl peroxide in a solvent system, only the weight of dicumyl peroxide per se is considered. Additionally, the exact amount of a specific curing agent utilized to obtain a specific melt flow index will vary from one curing agent to another, depending on the general activity or efficiency of the specific curing agent.

Another method of achieving the partial cure involves subjecting the blend to ionizing radiation. Ionizing rays include alpha rays, beta rays, gamma rays, electron beam, proton rays, neutron rays and X-rays. In most commercial applications, an accelerated electron beam is utilized. The radiation is desirably carried out by subjecting pellets or a thin layer of the blend to the radiation. The radiation may be admitted from one side or from both sides of the blend composition. The amount of radiation of course may vary with the thickness of the blend composition. In any event, a desirable amount of radiation is that which results in a partially cured blend having a melt flow index above the index number set forth above. Due to the inherent nature of the radiation, the cross-link density of the respective polymers will vary with the distance from the radiated surface. This aspect is acceptable as long as an overall, partially cured system is produced. However, an excessive does will result in a cross-linked system which cannot be molded or extruded and is not reprocessable. Using an electron accelerator, the amount of radiation penetration may vary from about 0.1 to 5.0 Megarads when the radiation is admitted to only one side of the blend composition, whereas penetration may vary from about 0.1 to about 3.0 Megarads when the radiation is applied to each side of the blend composition.

In addition to the curing agents as noted above, other rubber components, compounding agents, fillers, processing aids and the like may be added in conventional amounts. Specific types of additives include, in addition to accelerators, activators, colorants, antioxidants, flame retardants, ozone resistant compounds, and various processing aids such as oil, stearic acid, and the like. Examples of fillers include carbon black, such as from about 0.1 and preferably from about 0.6 parts to about 30 to 40 parts by weight per 100 parts of the blend. Other fillers such as silica, the various clays, calcium carbonate, talc and the like can be utilized in conventional amounts.

The blends of this invention, whether or not partially cured, generally have good physical properties and generally consist of two continuous phases. A few of the properties are completely unexpected such as the low brittle point. Other unexpected properties include minimum creep at high temperatures, good low temperature impact resistance, good elongation, good paint adhesion and good ozone and aging resistance. Generally, the unexpected properties as set forth hereinbelow are achieved by the blends of the present invention regardless of the exact amount of alpha-olefin polymer such as polypropylene and whether or not partially cured. However, as previously noted, partially cured blends do give improved tensile set as well as improved aging properties. The thermoplastic elasomer blends of the present invention usually achieve an elongation of at least 50 percent at break and preferably at least 200 percent. The maximum creep is less than 4 percent at 120° C. under a load of 0.08 MPa. The blends do not show any ozone cracking when tested according to ASTM D518. The low temperature impact at minus 30° C. and paint scuff resistance are good. The brittle point of the blends is generally below −20° C. and preferably below −45° C.

The improved ozone resistance is completely unexpected in that, as well known to those skilled in the art, butadiene polymers exhibit poor ozone resistance. Moreover, the blends also have very good flexibility properties and exhibit very good heat aging properties upon the addition of various heat resistant agents.

The exact combination of physical properties desired will depend upon the intended applications. The thermoplastic blends of the present invention are very versatile and flexible in that changes in the ratios of the polymer components and changes of compounding additives make it possible to generate a wide range of desired physical properties. These changes will be obvious to those skilled in the art of rubber or plastics compounding.

The thermoplastic elastomer blends of the present invention may be utilized to produce articles by molding, extruding, calendering; vacuum-forming, etc. with specific articles including tubing, gaskets, toys, household articles, and particularly various automobile parts such as flexible bumpers, dash panels, bumper filler panels and the like.

PREFERRED EMBODIMENTS

Specific procedures are described below for the preparation of high vinyl polybutadiene of controllable molecular weights. Where it is desired to produce a lower vinyl content and high 1,4 content, this may be effected by increasing the temperature above 90° F. (32° C.) until the desired microstructure is effected. Of course if a very low vinyl content, for example about 10%, is desired, that may be produced by omitting the 1,2-di-(N-methyl-piperazinyl-N')ethane.

PROCEDURE FOR PREPARATION OF HIGH VINYL POLYBUTADIENE OF CONTROLLED MOLECULAR WEIGHT

The following typical procedure is used to prepare the high vinyl polybutadiene: A cleaned 2-gallon stainless steel reactor equipped with stirrer, appropriate heating and cooling means, and appropriate inlets and outlets is prepared for reaction by filling it under a nitrogen atmosphere with hexane and adding n-butyl lithium in an amount sufficient to react with impurities in the hexane and on the surface of the reactor. The mixture is stirred and heated to 150° F. (65° C.) for about an hour. Then this mixture is drained under a nitrogen atmosphere and the material discarded. Next 7.5 lbs. of a blend containing 24% 1,3-butadiene (817 gms. butadiene) and 76% of hexane is charged to the reactor under nitrogen and cooled to 41° F. (5° C.) before adding 16.5 millimoles of n-butyl lithium and 33 millimoles of 1,2-di-(N-Methyl-piperazinyl-N')-ethane (DMPE). The temperature is maintained at 41° F. (5° C.) and efficient stirring effected. After about 8 hours of reaction, the product is dropped into a large volume of isopropanol containing an antioxidant. The precipitated product is recovered and drum-dried to give substantially 100% yield of a polymer having a molecular weight of about 50,000 $M_n$ and a 1,2 content of substantially 100%.

The molecular weight may be increased by decreasing the amount of n-butyl lithium and decreased by increasing the amount of n-butyl lithium, advantageously with appropriate changes in the amount of DMPE to give a DMPE/Li ratio of approximately 2. This method of varying or controlling the molecular weight by varying the amount of catalyst used per mole of monomer is well known in the anionic polymerization art.

The polymerization temperature has an effect on the 1,2 content of the product with increase in temperature within limits decreasing the 1,2 content, and vice versa within limits. It is generally desirable to maintain a temperature no higher than 41° F. (5° C.) to obtain maximum 1,2 content as shown by the folllowing table:

| Temperature | Approximate 1,2 Content |
|---|---|
| Below 41° F. (5° C.) | 100% |
| 41° F. (5° C.) | 99.8% |
| 48° F. (9° C.) | 98% |
| 75° F. (24° C.) | 97% |
| 85° F. (29° C.) | 95% |
| 90° F. (32° C.) | 90% |
| Above 90° F. (32° C.) | Less than 90% |

PROCEDURE FOR HYDROGENATION OF POLYBUTADIENE

The high vinyl polybutadiene (1200 gms) is dissolved in 5 gallons of toluene. This polymer solution is transferred to a stainless steel reactor equipped with means for stirring, heating and cooling and with inlet and outlet means. An additional gallon of toluene is added to the original mixing container to dissolve any residue of polymer and the resulting solution is also added to the reactor. The reactor is sealed and heated to 130° F. (55° C.) with stirring and sufficient vacuum is applied to remove any dissolved gases. Then the free space in the reactor is flushed twice with $H_2$ to 50 psi. After each flushing, vacuum is again applied to remove traces of dissolved gases. Then, with a hydrogen atomsphere maintained, the hydrogenation catalyst is added which comprises Ni/cyclohexene/triisobutyl aluminum in the molar ratio of 1/1/3-4 and 25-5 millimoles of Ni per 100 grams of polymer. After the catalyst is added the temperature is raised to 170°-190° F. (77°-88° C.) and hydrogen introduced to 150 psi. Since the hydrogenation is diffusion controlled, rapid stirring is effected. When the hydrogen pressure drops to 75-100 psi, the reactor is repressurized with hydrogen to 150 psi. Generally hydrogenation is complete in 7-10 hours to 90-99% hydrogenation of the unsaturation.

PROCEDURE FOR THE BLENDING OF HYDROGENATED POLYBUTADIENE AND POLYMERIC ALPHA-OLEFIN

The hydrogenated polybutadiene is sheeted out on a two roll mill at a temperature between 90°-120° C. The alpha-olefin polymer together with any desired additives or modifiers are then added, and milling is continued until the alpha-olefin polymer and additives are well dispersed in the polybutadiene. The blend is then cut into strips so that it can easily be fed into a twin screw extruder. The material is extruded at 200° C. into a quenching water bath and subsequently chopped into small pellets, which are then injection molded into plaques (15.2×10.2×0.2 cm). The plaques are tested for physical properties according to ASTM standards for tensile at break and elongation at break. Ozone aging is also tested to determine whether any cracks will form when the specimen is exposed to 60 pphm ozone at 37° C. for 14 hours. The following paint adhesion and cold impact tests are used.

PAINT ADHESION TEST

Before painting, a test plaque is first washed with a mild alkaline solution and water rinsed. After drying, the plaque is sprayed with Seibert Oxidermo primer and flash dried for at least 2 minutes. A topcoat of Durethane 100 is then applied and cured for 40 minutes at 120° C. The paint scuff resistance is evaluated by scratching the painted surface with the edge of a dime. For surfaces showing excellent paint adhesion, the paint cannot be scraped cleanly from the substrate. When adhesion is poor, the paint can be easily stripped off with only mild pressure exerted on the dime.

COLD IMPACT TEST

The cold impact test utilized is one that General Motors requires for flexible thermoplastic elastomer parts. For this test, the ends of a painted specimen (7.62×15.2×0.3 cm.) are inserted into grooves cut into a base plate 7.62 cm apart. The test sample is then allowed to stand at −30° C. for at least four hours. After this, the dome-like test specimen is impacted at the apex by a hemispherical dart (5 cm. diameter, 27 kg) dropped from a height of 42.2 cm. In order to pass this test, the sample must not break or crack.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

Three experiments are performed to prepare polybutadiene of varying 1,2 contents and molecular weights, and the hydrogenated products thereof above. The 1,2 microstructure is distributed at random through the polymer chains. Various properties of the polybutadienes and their hydrogenated products are determined as noted in Table I below. The various hydrogenated polymers are blended in a proportion of 60 parts of hydrogenated polymer to 40 parts of isotactic polypropylene (having a melt index of 4) blended in accordance with the blending procedure described above, and physical properties of the resultant blends are determined as reported in Table I below. Moreover the various blends exhibit excellent ozone resistance, paint adhesion and cold impact properties.

TABLE I

| Run | A | B | C |
|---|---|---|---|
| Mol. Wt. | | | |
| G.P.C.($M_n$) | 270,000 | 130,000 | 166,000 |
| D.S.V. | 2.67 | 2.0 | 2.22 |
| Gel (%) | 0.0 | 0.0 | 0.0 |
| 1,2 (%) (Infrared) | 27.2 | 32.5 | 37.1 |
| % Hydrog. | 95 | 100 | 95 |
| Properties of 60/40 Blend | | | |
| Tensile Strength (psi) | 3,829 | 4,104 | 2,944 |

TABLE I-continued

| Run | A | B | C |
|---|---|---|---|
| Elongation (%) | 734 | 1,120 | 804 |
| Tear Strength | 97.2 | 87.0 | 96.7 |
| Flexural Modulus (psi) | 37,418 | 36,258 | 31,907 |

In addition to the methods described above to prepare the polymers, the hydrogenate them and to blend them with the polymeric alpha-olefins, various modifications of these methods and equivalent methods for producing similar results may also be used.

While certain features of this invention have been described in detail with respect to various embodiments thereof, it will of course be apparent that other modifications can be made within the spirit and scope of this invention and it is not intended to limit the invention to the exact details shown above except insofar as they are defined in the following claims:

The invention claimed is:

1. A thermoplastic elastomer composition comprising a blend of (a) a hydrogenated polybutadiene having, prior to hydrogenation, 40-100 percent 1,2-microstructure and said hydrogenation having been effected to remove at least 85 percent of the original unsaturation, and (b) a polymer of at least one alpha-olefin having 2-20 carbon atoms, said alpha-olefin polymer having a melting point of at least 90° C. and having at least 45 percent crystalline structure therein; the amount of said hydrgenated polybutadiene comprising 40-90 percent by weight and the amount of alpha-olefin polymer comprising 10-60 percent by weight, said percentage being based on the combined weight of components (a) and (b).

2. The thermoplastic elastomer composition of claim 1 in which said alpha-olefin polymer is a homopolymer of propylene.

3. The thermoplastic elastomer composition of claim 1 in which said alpha-olefin polymer is a hompolymer of ethylene.

4. The thermoplastic elastomer composition of claim 1 in which said alpha-olefin polymer is a copolymer of propylene and ethylene.

5. The thermoplastic elastomer composition of claim 4 in which said copolymer comprises at least 50 percent by weight of propylene.

6. The thermoplastic elastomer composition of claim 1 in which said hydrogenated polybutadiene is the hydrogenation product of a polybutadiene having at least 50 percent 1,2-microstructure.

7. The thermoplastic elastomer composition of claim 1 in which the amount of said hydrogenated polybutadiene comprises 52-85 percent by weight and the amount of alpha-olefin polymer comprises 15-48 percent by weight.

8. The thermoplastic elastomer composition of claim 6 in which said alpha-olefin polymer is a homopolymer of propylene.

9. The thermoplastic elastomer composition of claim 1 in which said alpha-olefin polymer is isotactic homopolymer of propylene.

10. The thermoplastic elastomer composition of claim 7 in which there is also present 2-20 parts by weight of polyisobutylene per 100 parts by weight of said blend.

11. The thermoplastic elastomer composition of claim 1 in which said hydrogenated polybutadiene blend has a melt flow index of at least 1.0.

12. The thermoplastic elastomer of claim 1 in which said alpha-olefin polymer comprises 30-42 percent by weight of said blend.

13. The thermoplastic elastomer of claim 12 in which said alpha-olefin polymer is a homopolymer of propylene.

14. The thermoplastic elastomer of claim 12 in which said alpha-olefin polymer is a copolymer of propylene and ethylene containing at least 50 percent by weight of propylene.

15. The process for making the thermoplastic elastomer composition of claim 1 comprising the steps of: (1) mixing said alpha-olefin polymer and said hydrogenated polybutadiene polymer and (2) heating said mixture at a temperature of at least 90° C.

16. The process of claim 15 in which said blend has a melt flow index of at least 1.0.

* * * * *